United States Patent
Hildebrand et al.

(10) Patent No.: US 11,323,825 B2
(45) Date of Patent: May 3, 2022

(54) ADJUSTING TREBLE GAIN OF HEARING DEVICE

(71) Applicant: SONOVA AG, Staefa (CH)

(72) Inventors: Nicola Hildebrand, Uster (CH); Erich Crameri, Zürich (CH); Marius Beuchert, Waedenswil (CH)

(73) Assignee: Sonova AG, Staefa (CH)

( * ) Notice: Subject to any disclaimer, the term of this patent is extended or adjusted under 35 U.S.C. 154(b) by 1 day.

(21) Appl. No.: 16/997,739

(22) Filed: Aug. 19, 2020

(65) Prior Publication Data

US 2021/0058715 A1  Feb. 25, 2021

(30) Foreign Application Priority Data

Aug. 22, 2019 (EP) ..................................... 19193055

(51) Int. Cl.
*H04R 25/00* (2006.01)
*G06F 3/16* (2006.01)

(52) U.S. Cl.
CPC ........... *H04R 25/505* (2013.01); *G06F 3/165* (2013.01); *H04R 25/558* (2013.01); *H04R 2225/55* (2013.01)

(58) Field of Classification Search
CPC ................ H04R 25/505; H04R 25/558; H04R 2225/55; H04R 2225/43; H04R 25/353; G06F 3/165; G06F 3/16; G06F 3/167
See application file for complete search history.

(56) References Cited

U.S. PATENT DOCUMENTS

| | | | |
|---|---|---|---|
| 2013/0208935 A1* | 8/2013 | Hakansson | H04R 3/08 381/326 |
| 2020/0275217 A1* | 8/2020 | Guo | H03G 9/005 |
| 2021/0297792 A1* | 9/2021 | Ma | H04R 25/505 |

* cited by examiner

*Primary Examiner* — Tuan D Nguyen
(74) *Attorney, Agent, or Firm* — ALG Intellectual Property, LLC

(57) ABSTRACT

A method for adjusting a gain of a hearing device includes receiving a demand for increasing a treble of an output sound signal; determining a frequency dependent headroom curve, the headroom curve indicating up to which gain value a frequency of the sound signal is amplifiable; comparing the headroom curve with a gain curve; when the gain curve is below the headroom curve, increasing the gain curve in a treble range; and when the gain curve has reached the headroom curve in the treble range, frequency lowering the sound signal, such that frequencies of the sound signal are moved from the treble range into a middle range of frequencies below the treble range.

14 Claims, 2 Drawing Sheets

ADJUSTING TREBLE GAIN OF HEARING DEVICE

RELATED APPLICATIONS

The present application claims priority to EP Patent Application No. 19193055.1, filed Aug. 22, 2019, the contents of which are hereby incorporated by reference in their entirety.

BACKGROUND INFORMATION

Hearing devices are generally small and complex devices. Hearing devices can include a processor, microphone, speaker, memory, housing, and other electronical and mechanical components. Some example hearing devices are Behind-The-Ear (BTE), Receiver-In-Canal (RIC), In-The-Ear (ITE), Completely-In-Canal (CIC), and Invisible-In-The-Canal (IIC) devices. A user can prefer one of these hearing devices compared to another device based on hearing loss, aesthetic preferences, lifestyle needs, and budget.

A hearing device often has functions (or so called modifiers) for manually adjusting the sound output of the hearing device. For example, the overall volume, treble and bass may be adjusted by such modifiers.

Often, users have the desire to modify the perception of high frequency signal information and use for this a treble modifier. Usually, these high frequency/treble modifiers are pure gain modifiers, which may be limited by an input volume dependent maximal gain. Very often, the gain can be increased only for very loud sounds. The result of the tuning action of the user is then not that soft to normal sounds are brighter, but that loud sounds are more shrill.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
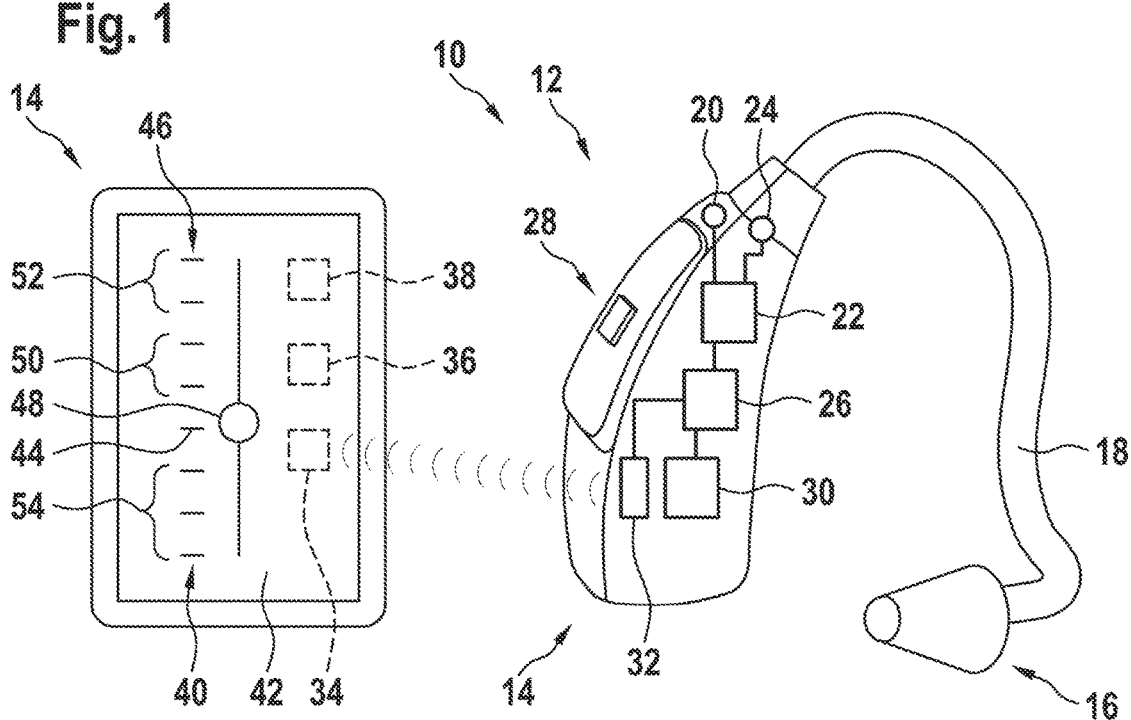
FIG. 1 schematically shows a hearing system according to an embodiment.

Described herein are a method, a computer program, a computer-readable medium and a hearing system for adjusting a gain of a hearing device.

An aspect described herein is to improve the audible effects of a treble modifier of a hearing device.

This aspect is achieved by the subject-matter of the independent claims. Further exemplary embodiments are evident from the dependent claims and the following description.

A first aspect relates to a method for adjusting a gain of a hearing device. A hearing device may be a device as described above. A hearing device may be a hearing aid adapted for compensating the hearing loss of a user. The hearing device may be adapted for receiving a sound signal, for example with a microphone and/or via a wireless radio transmission, for frequency dependent amplifying the sound signal into the output sound signal and for outputting the output sound signal to the ear of a user of the hearing device, for example with a loudspeaker and/or so called receiver.

The method as described herein may be performed automatically by the hearing device and optionally a mobile device in data communication with the hearing device.

According to an embodiment, the method comprises: receiving a demand for increasing a treble of the output sound signal. This demand may be generated with a knob of the hearing device and/or with a user interface of a mobile device of the user communicatively interconnected with the hearing device. It has to be noted that below also a demand for decreasing the treble is discussed. Such demands may be a value such as +1 and −1 and/or may be derived, when a treble modifier value is increased and/or decreased.

According to an embodiment, the method comprises: determining a frequency dependent headroom curve, the headroom curve indicating up to which gain value a frequency of the sound signal is amplifiable. The headroom curve also may depend on an input volume of the sound signal. The headroom curve may be determined from a table and/or with a function, which may be stored in the hearing device.

The headroom curve may be set dependent on the user (i.e. the hearing loss of the user) and/or the hearing device. For example, different in-the-ear parts may result in different headroom curves depending on the occlusion of the ear channel of the user.

In general, for the present method, the headroom curve may be solely determined in a treble range of frequencies and optionally a middle range of the frequencies. The treble range may comprise frequencies above 4 kHz, the middle range may comprise frequencies between 2 kHz and 4 kHz. The middle range and/or the treble range (and in particular their lower and upper ends) may depend on the hearing loss of the user and/or the determined headroom curve.

In general, a curve, as described herein, such as the headroom curve or the gain curve as described below, may define a function, which determines a specific gain for a specific input frequency. Such a curve may be defined by a set of points and the other values of the curve may be determined by interpolation between these points. For example, the amplification of the hearing device may be performed in frequency bands and a value for every frequency band may be provided.

According to an embodiment, the method further comprises: comparing the headroom curve with a gain curve, whether the gain curve is below the headroom curve in a treble range of frequencies, the gain curve determining, which gain is applied to the sound signal in which frequency. The gain curve may be a set of values, which encode, at which frequency the sound signal is amplified with which gain value. As the headroom curve, the gain curve may be dependent on the input volume of the sound signal.

The gain curve may be below the headroom curve, when all values of the gain curve in the treble range are below the respective values of the headroom curve. The gain curve may be above the headroom curve, when one value of the gain curve in the treble range is above the respective value of the headroom curve.

According to an embodiment, the method further comprises: increasing the gain curve in the treble range, when the gain curve is below the headroom curve. With the comparison, it may be determined, whether there is space for increasing the gain in the treble range or not. When there is space, values of the gain curve may be increased and the user may hear an increase in loudness of treble sounds.

According to an embodiment, the method further comprises: frequency lowering the sound signal, such that frequencies of the sound signal are moved from the treble range into a middle range of frequencies below the treble range, when the gain curve has reached the headroom curve in the treble range.

When there is no space for further increasing the gain in the treble range, frequency lowering of frequencies in the middle range and treble range may be applied. Frequency lowering may refer to changing frequencies of the sound signal in a frequency range in such a way that higher frequencies in the frequency range are mapped to lower frequencies. For example, the lower end of the frequency range may stay the same and the upper end may be mapped to a reduced upper end between the lower end the upper end. Values between the lower end and the upper end may be mapped in a continuous way. In such a way, frequency lowering also may comprise frequency compression. The lower end, the upper end, and the reduced upper end may be stored as frequency lowered parameters in the hearing device. Frequency lowered parameters also may be seen as frequency compression parameters, when a frequency compression takes place.

In such a way, frequencies, which may have a lower headroom in the treble range, are mapped to frequencies, where a higher headroom is available. It is usually the case that the headroom curve has smaller values in the treble range as in the middle range. Furthermore, the hearing loss of the user is usually higher in higher frequencies and frequencies may be moved to a region, where the perception of the user is better.

It also may be that a frequency lowering is already set in the hearing device. In this case, a second frequency lowering may be applied to an already present frequency lowering. This may be achieved by increasing the already present frequency lowering.

It may be that the gain curve is adjusted into an adjusted gain curve and/or that frequency lowered parameters, which are stored in the hearing device and which specify the frequency lowering, are adjusted into adjusted frequency lowered parameters. These modified data then may be applied to a sound processor of the hearing device. In this case, the method may further comprise: applying the adjusted gain curve and/or the adjusted frequency lowered parameters to the sound processor of the hearing device, such that the sound signal processed by the hearing device and output by the hearing device to the user is amplified according to the adjusted gain curve and/or adjusted frequency lowered parameters.

According to an embodiment, the gain curve is additionally increased in the middle range to which frequencies of the sound signal in the treble range are moved. It may be that there is more space to the headroom curve for increasing the gain in the middle range as in the treble range.

According to an embodiment, the method further comprises: receiving a demand for decreasing a treble of the output sound signal; and determining, whether the sound signal is frequency lowered, such that frequencies of the sound signal are moved from the treble range into a middle range below the treble range. When the frequency lowering is higher than a threshold, reducing the frequency lowering. When the user wishes to reduce the loudness of the treble, it may be that the perceived loudness is caused by a frequency lowering of frequencies in the treble range. In this case, the perceived loudness of these frequencies may be achieved by reducing the frequency lowering.

The frequency lowering in this step may have been generated by a previously applied demand for increasing the treble and/or may be due to settings in the hearing device, such as fitting parameters. For example, the threshold to which the actual frequency lowering is compared may be the fitted frequency lowering.

According to an embodiment, when the frequency lowering is lower than the threshold, decreasing the gain curve in the treble range. However, it also may be that simply the gain in the treble range is reduced, when a demand for decreasing the treble gain is received.

According to an embodiment, the method further comprises: receiving a treble modifier value in the hearing device, the treble modifier value indicating an offset of a treble amplification with respect to a neutral setting, the neutral setting comprising a preset gain curve and a preset frequency lowering. Usually, the volume modifier value may be selected by a user of the hearing device. For example, the hearing device and/or a mobile device in data communication with the user provides a user interface for selecting the volume modifier value. The treble modifier value may be selected from a range of integers. For example, the first value may be a negative value, the neutral value may be 0 and the second value may be a positive value.

The neutral settings may comprise a preset, fitted gain curve and/or unmodified gain curve, which may be used, when no modifier is applied. The preset, fitted gain curve and/or unmodified gain curve may be stored in a memory of the hearing device. The neutral settings also may comprise preset, fitted and/or unmodified frequency lowering parameters, which also may be stored in a memory of the hearing device. For example, the preset, fitted and/or unmodified gain curve and/or frequency lowered parameters may have been fitted to a hearing loss of a user of the hearing device.

According to an embodiment, a demand for increasing and/or decreasing a treble of the output sound signal is received, when the treble modifier value is increased and/or decreased. The demand may be determined by comparing the newly received treble modifier value with the actual applied treble modifier value.

According to an embodiment, when the treble modifier is in a first range of treble modifier values above a neutral value, the gain curve is increased, such that the gain curve stays below the headroom curve. The first range may be seen as a treble amplification range and/or the amplification in this range may be selected, such that the space between the preset gain curve for the neutral treble value and the headroom curve is used for gain increase.

According to an embodiment, when the treble modifier value is in a second range of treble modifier values above the first range, the sound signal is frequency lowered, such that frequencies of the sound signal are moved from the treble range into a middle range below the treble range. The second range may be seen as treble frequency lowering range. The second range may be chosen, such that the gain curve has reached the headroom curve in the treble range and such that frequency lowering is used for achieving a further perceived amplification of treble sound.

It also may be that in the second range of treble modifier values, the gain curve is additionally increased in the middle range to which frequencies of the sound signal in the treble range are moved.

According to an embodiment, the method further comprises: reducing the frequency lowering, when the treble modifier is below the neutral value and the sound signal is frequency lowered from the treble range to the middle range more than a threshold. As described above, the frequency lowering and/or the gain in the middle range may be reduced, when treble modifier values below the neutral value are selected.

According to an embodiment, the middle range and the treble range are selected, such that a headroom in the middle range is higher as in the treble range. As already mentioned, there may be a region in higher frequencies, where the headroom curve decreases with increasing frequencies. When the middle range and the treble range are chosen within this region, the headroom in the middle range may be higher as in the treble range. In such a way, it may be utilized that the frequency lowered sound signal can be amplified stronger in the middle range as in the treble range.

According to an embodiment, the method further comprises: providing a user interface with a mobile device of the user, wherein the user interface comprises a treble control element changeable by the user for selecting a demand for increasing and decreasing a treble of the output sound signal. A mobile device carried by the user, such as a smartphone or tablet computer, may be in data communication with the hearing device. The mobile device may provide a computer program for adjusting parameters in the hearing device. This computer program may comprise a graphical user interface with a control element, such as a slider, for setting the treble modifier value. For example, with the treble control element, a treble modifier value may be selected.

When the user has selected a demand for increasing and decreasing a treble and/or the treble modifier value, the selected value may be sent from the mobile device to the hearing device. All further method steps described above with respect to receiving the demand, etc. may be performed by the hearing device.

Further aspects relate to a computer program for controlling a gain of a hearing device, which, when being executed by a processor, is adapted to carry out the steps of the method as described in the above and in the following as well as to a computer-readable medium, in which such a computer program is stored.

For example, the computer program may be executed in a processor of the hearing device, which hearing device, for example, may be carried by the person behind the ear. The computer-readable medium may be a memory of this hearing device. The computer program also may be executed at least partially by a processor of a mobile device and the computer-readable medium may be a memory of the mobile device. It may be that steps of the method are performed by the hearing device and other steps of the method are performed by the mobile device.

In general, a computer-readable medium may be a floppy disk, a hard disk, an USB (Universal Serial Bus) storage device, a RAM (Random Access Memory), a ROM (Read Only Memory), an EPROM (Erasable Programmable Read Only Memory) or a FLASH memory. A computer-readable medium may also be a data communication network, e.g. the Internet, which allows downloading a program code. The computer-readable medium may be a non-transitory or transitory medium.

A further aspect relates to a hearing system adapted for performing the method as described in the above and in the following. The hearing system may comprise a hearing device and optionally a mobile device providing a user interface as described above. The hearing device and/or the mobile device may comprise a processor and a memory, in which the computer program is stored. The hearing device may comprise a microphone for acquiring a sound signal, which is frequency dependent amplified and/or lowered with the method.

It has to be understood that features of the method as described in the above and in the following may be features of the computer program, the computer-readable medium and the hearing system as described in the above and in the following, and vice versa.

These and other aspects will be apparent from and elucidated with reference to the embodiments described hereinafter.

FIG. 1 schematically shows a hearing system 10 with a hearing device 12 in the form of a behind-the-ear device and a mobile device 14. It has to be noted that the hearing device 12 is a specific embodiment and that the method described herein also may be performed by other types of hearing devices, such as in-the-ear devices.

The hearing device 12 comprises a part 15 behind the ear and a part 16 to be put in the ear channel of a user. The part 15 and the part 16 are connected by a tube 18. In the part 15, a microphone 20, a sound processor 22 and a sound output device 24, such as a loudspeaker, are provided. The microphone 20 may acquire environmental sound of the user and may generate a sound signal, the sound processor 22 may amplify the sound signal and the sound output device 24 may generate sound that is guided through the tube 18 and the in-the-ear part 16 into each channel of the user.

The hearing device 12 may comprise a processor 26, which is adapted for adjusting parameters of the sound processor 22, which parameters control the frequency and volume dependent amplification of the sound signal as well as an optional frequency lowered of the sound signal. Among others, these parameters may comprise parameters for a gain curve and frequency lowering parameters.

All these parameters may be determined by a computer program run on the processor 26. For example, with a knob 28 of the hearing device 12, a user may select a modifier (such as bass, treble, noise suppression, dynamic volume, etc.) and levels and/or values of these modifiers may be selected, which change the frequency dependent gain, the volume and/or the frequency lowered applied by the sound processor 22 to the sound signal. All these functions may be implemented as computer programs stored in a memory 30 of the hearing device 12, which computer programs may be executed by the processor 22.

The hearing device 12 may comprise a sender/receiver 32 for (for example wireless) data communication with a sender/receiver 34 of the mobile device 14, which may be a smartphone or tablet computer. It is also possible that the above-mentioned modifiers and their levels and/or values are adjusted with the mobile device 14. This may be performed with a computer program run in a processor 36 of the mobile device 14 and stored in a memory 38 of the mobile device 14. The computer program may provide a graphical user interface 40 on a display 42 of the mobile device 14.

In the case of adjusting the treble, the graphical user interface 40 may comprise a slider 44, which is used for selecting a treble modifier value 46, which is indicated by lines besides the slider 44. The selected treble modifier value 46 may be sent to the hearing device 12. Alternatively or additionally, the user may select the treble modifier value 46 with the hearing device 12 itself, for example via the knob 28.

Based on the treble modifier value 46, the hearing device 12 determines and/or adjusts the amplification of the sound signal as described above and below and/or may change the parameters of the sound processor 22 accordingly.

FIG. 1 furthermore shows a neutral treble modifier value 48 and several ranges 50, 52, 54 of treble modifier value, which will be explained in more detail below.

Figure 2:
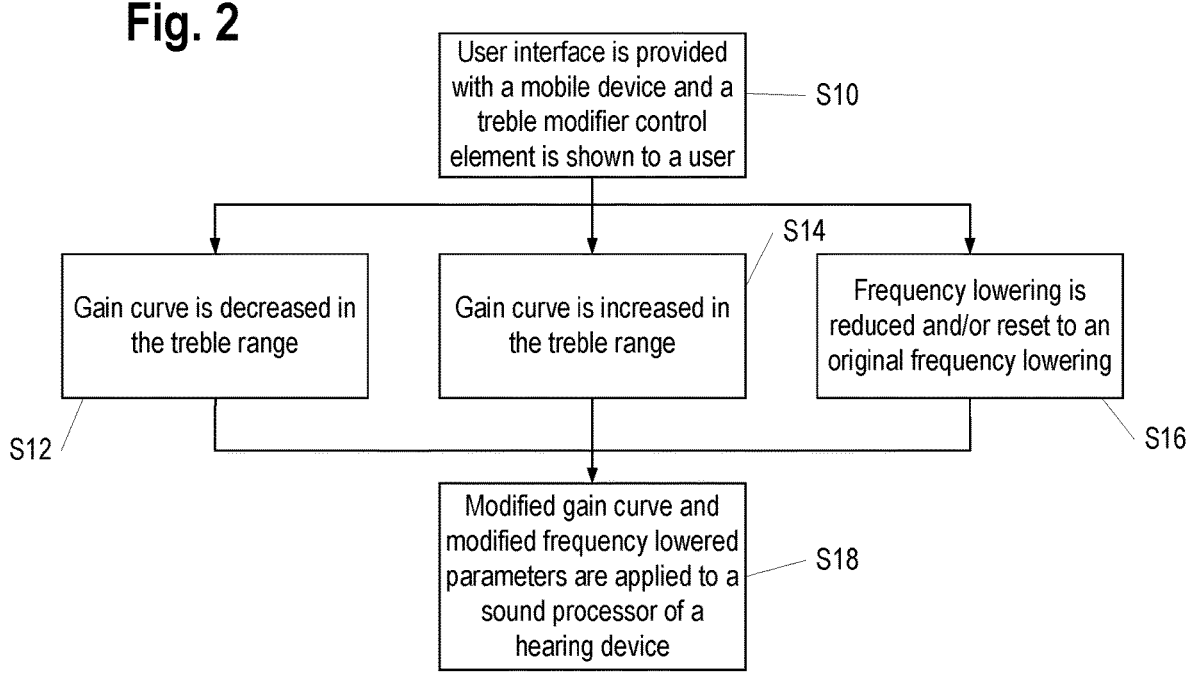
FIG. 2 shows a flow diagram for a method for controlling a hearing device according to an embodiment.

FIG. 2 shows a method for adjusting a gain of the hearing device 12, which may be performed by the hearing system 10.

In step S10, the user interface 40 is provided with the mobile device 14 and the treble modifier control element 42 is shown to the user. The user then may select a new treble modifier value 46. When the user has selected the new treble modifier value 46, it is sent from the mobile device 14 to the hearing device 12.

Alternatively, the user may select a new treble modifier value 46 with a user interface of the hearing device 12, such as the knob 28.

In the end, the new volume modifier value 46 is received in a computer program executed in the hearing device 12, which performs the following steps.

The new treble modifier value 46 received in the hearing device 12 may be seen as a demand 46 for increasing and/or decreeing the treble of the output sound signal.

Depending on the value range 50, 52, 54 in which the new treble modifier value 46 is, and/or the currently applied gain and/or frequency lowering of the hearing device 12, the method then continues in steps S12, S14 or S16, which will be described with respect to FIGS. 3 and 4.

Figure 3:
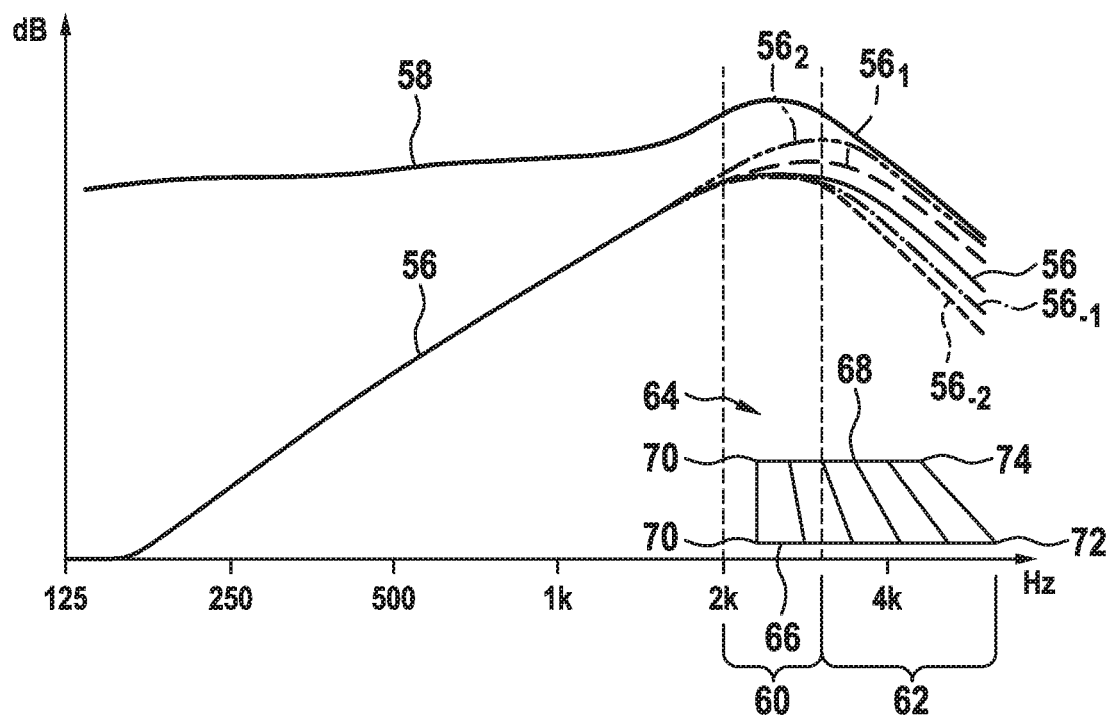
FIG. 3 shows a diagram with gain curves used in the method of FIG. 2.
Figure 4:
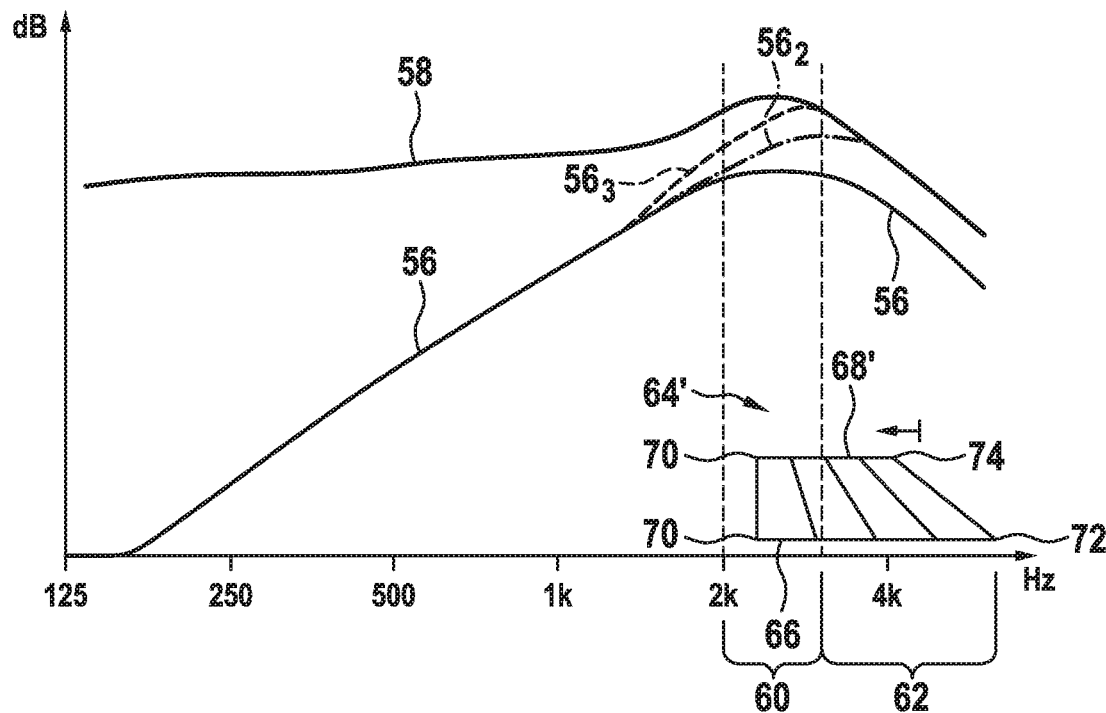
FIG. 4 shows a further diagram with gain curves used in the method of FIG. 2.

FIGS. 3 and 4 show diagrams with gain curves, wherein frequencies are depicted in the horizontal direction and the gain is depicted in a vertical direction.

Both figures show a preset gain curve 56 and a headroom curve 58. In general, a gain curve 56 indicates, at which frequency the sound signal is amplified by which value. The preset gain curve 56 may be a fitted gain curve 56, which may have been stored in the hearing device 12 during fitting of the hearing device 12. The headroom gain curve 58 indicates the maximal possible and/or desired gain in the respective frequency.

In FIGS. 3 and 4, also a middle range 60 and a treble range 62 of frequencies are shown. The demand for increasing and/or decreasing the treble should result in a corresponding perceived increase of the volume of the input sound signal in the treble range 62. This is done in the method by really increasing the gain in these frequencies and additionally by moving parts of the sound signal with frequencies in the treble range 62 into the middle range 60. Alone this movement may result in a perceived increase of the treble. Additionally, the gain also may be increased in the middle range 62.

The middle range 60 and the treble range 62 may be selected, such that the headroom curve 58 in the middle range 60 is higher as in the treble range 62, such as shown in FIGS. 3 and 4. Usually, the headroom curve 58 tends to decrease in a region of higher frequencies, which is due to a higher hearing loss of the user and/or due to physical reasons with respect to the part 16 in the ear of the user. With such a selection, parts of the sound signal moved from the treble range 62 to the middle range 60 with frequency lowering may be amplified even more.

FIG. 3 also depicts a possible preset frequency lowering 64. The frequency lowering 64 may change frequencies of the sound signal in an input frequency range 66, in such a way that higher frequencies in the frequency 66 range are mapped to lower frequencies in a lowered and/or compressed frequency range 68. For example, the lower end 70 of the frequency ranges 66, 68 may stay the same and the upper end 72 of the input frequency range 66 may be mapped to a reduced upper end 74 of the lowered frequency range 68, which reduced upper end 74 is situated between the lower end 70 and the upper end 72 of the input frequency range 66. Values between the lower end 70 and the upper end 72 may be mapped in a continuous way. The lower end 70, the upper end 72 and the reduced upper end 74 may be stored as frequency lowered parameters in the hearing device 12.

Returning to the method of FIG. 2, in the end of step S10, the treble modifier value 46 is received in the hearing device 12. The treble modifier value 46 may indicate an offset of a treble amplification with respect to a neutral value 48, such as 0, in which a neutral setting is applied to the sound processor of the hearing device 12. The neutral setting comprises a preset gain curve 56 and a preset frequency lowering 64.

A demand for increasing a treble of the output sound signal may be received, when the treble modifier value 46 is increased and/or a demand for decreasing a treble of the output sound signal may be received, when the treble modifier value 46 is decreased.

The method continues in step S12, when the treble modifier value 46 is in the range 54 and/or below the neutral value 48. In this case, the gain curve 56 is decreased in the treble range 62, such as indicated by the decreased gain curves 56-1 and 56-2.

It also may be in this case, when there is a preset frequency lowering 64, which is higher than a threshold, that the frequency lowering 64 is reduced. The rate of frequency lowering may be determined by the difference of the upper end 72 and the reduced upper end 74. When this rate is higher than a threshold value, the reduced upper end may be moved to higher frequencies.

The method continues in steps S14 and S16, when the treble modifier value 46 is above the neutral value 48. In this case, the frequency dependent and optionally volume dependent headroom curve 58 is determined at least in the treble range 62. Parameters for the headroom curve 58 may be stored in the hearing device 12 and from these parameters, the hearing device 12 may calculate support points of the headroom curve 58.

Also the gain curve 56, 561, 562, which is actually applied to the hearing device 12 and/or the sound processor 22, is determined. The headroom curve 58 is then compared with the gain curve 56, 561, 562, whether the gain curve 56 is below the headroom curve 58 in the treble range 62.

As shown in FIG. 3, the gain curves 56, 561 are below the headroom curve 58, while the gain curve 562 has reached the headroom curve 58.

When the gain curve 56, 561 is below the headroom curve 58, the method continues with step S14. In step S14, the gain curve 56, 561 is increased in the treble range 62. This may be performed by adding a positive offset to values of the gain curve 56, 561 in the treble range 62. In FIG. 3, in a first step, gain curve 56 is increased to gain curve 561, and in a second step, gain curve 561 is increased to gain curve 562.

Step S14 may be performed, when the treble modifier value 46 is in the first range 50 of treble modifier values above the neutral value 48. The gain curve 561, 562 is then increased, such that the gain curve stays below the headroom curve 58.

When the gain curve 562 has reached the headroom curve 58 in the treble range 62, the method continues in step S16. Step S16 may be performed, when the treble modifier value 46 is in the second range 52 of treble modifier values.

In this case, in a first step, the sound signal may be lowered or may be stronger lowered, such that frequencies of the sound signal are moved from the treble range 62 into the middle range 60. This is shown in FIG. 4 with a modified frequency lowering and/or frequency compression 64'. The reduced upper end 74 of the lowered and/or compressed range 68' may be further reduced to the value 74'. In such a way, parts of the sound signal, which are in the treble range 62, are perceived by the user in the middle range 62, where his hearing loss may be milder and may be perceived louder.

It also may be that in a second step, the gain curve 562 is additionally increased to the gain curve 563 in the middle range 60 to which frequencies of the sound signal in the treble range 62 are moved.

In the above, the steps S14 and S16 of the method have been explained with respect to a situation, where the user increased the treble modifier value 46. In the other direction, when the user decreases the treble modifier value 46, a demand 46 for decreasing a treble of the output sound signal is received in the hearing device.

In step S16, it may be determined, whether the sound signal has already be frequency lowered, and, when the frequency lowering 64' is higher than a threshold and/or higher than the preset frequency lowered 64, the frequency lowering 64' may be reduced and/or reset to the original frequency lowering 64.

In step S14, when the frequency lowering 64 is lower than the threshold and/or already set to the preset frequency lowering 64, the gain curve may be reduced in the treble range, for example from the curve 562 to the curve 561 to the curve 56.

In step S18, the modified gain curve and the modified frequency lowered parameters are applied to the sound processor 22 of the hearing device 12. A sound signal, for example a sound signal acquired by the microphone 20, is processed accordingly by the hearing device 12. The processed sound signal is then output by the hearing device 12 with the sound output device 24.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 hearing system
12 hearing device
14 mobile device
15 part behind the ear
16 part in the ear
18 tube
20 microphone
22 sound processor
24 sound output device
26 processor
28 knob
30 memory
32 sender/receiver
34 sender/receiver
36 processor
38 memory
40 graphical user interface
42 display
44 slider
46 demand for treble modification, treble modifier value
48 neutral treble modifier value
50 first treble modifier value range
52 second treble modifier value range
54 third treble modifier value range
56 preset gain curve
561 increased gain curve
562 increased gain curve
563 increased gain curve
56-1 decreased gain curve
56-2 decreased gain curve
58 headroom curve
60 middle range
62 treble range
64 preset frequency lowering
64' modified frequency lowering
66 input frequency range
68 lowered and/or compressed frequency range
68' modified lowered and/or compressed frequency range
70 lower end
72 upper end
74 reduced upper end
74' further reduced upper end

What is claimed is:

1. A method for adjusting a gain of a hearing device, the hearing device receiving a sound signal, frequency dependent amplifying the sound signal and outputting the sound signal to a user of the hearing device, the method comprising:
   receiving a demand for increasing a treble of the output sound signal;
   determining a frequency dependent headroom curve, the headroom curve indicating up to which gain value a frequency of the sound signal is amplifiable;
   comparing the headroom curve with a gain curve, whether the gain curve is below the headroom curve in a treble range of frequencies, the gain curve determining, which gain is applied to the sound signal in which frequency;
   when the gain curve is below the headroom curve, increasing the gain curve in the treble range; and
   when the gain curve has reached the headroom curve in the treble range, frequency lowering the sound signal, such that frequencies of the sound signal are moved from the treble range into a middle range of frequencies below the treble range.

2. The method of claim 1, wherein the gain curve is additionally increased in the middle range to which frequencies of the sound signal in the treble range are moved.

3. The method of claim 1, further comprising:
   receiving a demand for decreasing a treble of the output sound signal;
   determining, whether the sound signal is frequency lowered, such that frequencies of the sound signal are moved from the treble range into the middle range below the treble range;
   when the frequency lowering is higher than a threshold, reducing the frequency lowering.

4. The method of claim 3, when the frequency lowering is lower than the threshold, decreasing the gain curve in the treble range.

5. The method of claim 1, further comprising:
receiving a treble modifier value in the hearing device, the treble modifier value indicating an offset of a treble amplification with respect to a neutral setting, the neutral setting comprising a preset gain curve and a preset frequency lowering;
wherein a demand for increasing a treble of the output sound signal is received, when the treble modifier value is increased.

6. The method of claim 5, wherein, when the treble modifier value is in a first range of treble modifier values above a neutral value, the gain curve is increased, such that the gain curve stays below the headroom curve.

7. The method of claim 5, wherein, when the treble modifier value is in a second range of treble modifier values above the first range, the sound signal is frequency lowered, such that frequencies of the sound signal are moved from the treble range into the middle range.

8. The method of claim 7, wherein the gain curve is additionally increased in the middle range to which frequencies of the sound signal in the treble range are moved.

9. The method of claim 5, wherein, when the treble modifier value is below the neutral value and the sound signal is frequency lowered from the treble range to the middle range more than a threshold, reducing the frequency lowering.

10. The method of claim 5, wherein the middle range and the treble range are selected, such that the headroom curve in the middle range is higher as in the treble range.

11. The method of claim 5, further comprising:
providing a user interface with a mobile device of the user, wherein the user interface comprises a treble control element changeable by the user for selecting a demand for increasing and decreasing a treble of the output sound signal; and
sending the selected demand to the hearing device.

12. A non-transitory computer-readable medium for controlling a gain of a hearing device, the non-transitory computer-readable medium storing a computer program that, when executed, directs a processor to:
receive a demand for increasing a treble of the output sound signal;
determine a frequency dependent headroom curve, the headroom curve indicating up to which gain value a frequency of the sound signal is amplifiable;
compare the headroom curve with a gain curve, whether the gain curve is below the headroom curve in a treble range of frequencies, the gain curve determining, which gain is applied to the sound signal in which frequency;
when the gain curve is below the headroom curve, increase the gain curve in the treble range; and
when the gain curve has reached the headroom curve in the treble range, frequency lower the sound signal, such that frequencies of the sound signal are moved from the treble range into a middle range of frequencies below the treble range.

13. A hearing system comprising a hearing device, wherein the hearing system is adapted to:
receive a demand for increasing a treble of the output sound signal;
determine a frequency dependent headroom curve, the headroom curve indicating up to which gain value a frequency of the sound signal is amplifiable;
compare the headroom curve with a gain curve, whether the gain curve is below the headroom curve in a treble range of frequencies, the gain curve determining, which gain is applied to the sound signal in which frequency;
when the gain curve is below the headroom curve, increase the gain curve in the treble range; and
when the gain curve has reached the headroom curve in the treble range, frequency lower the sound signal, such that frequencies of the sound signal are moved from the treble range into a middle range of frequencies below the treble range.

14. The hearing system of claim 13, wherein the hearing system further comprises a mobile device providing a user interface for selecting a demand for increasing and decreasing the treble of the output sound signal.

\* \* \* \* \*